United States Patent
Patel et al.

(10) Patent No.: US 12,314,351 B2
(45) Date of Patent: May 27, 2025

(54) NETWORK COMMUNICATION USING PROOF OF PRESENCE

(71) Applicant: Microsoft Technology Licensing, LLC, Redmond, WA (US)

(72) Inventors: Ankur Patel, Sammamish, WA (US); Brandon Murdoch, Reading (GB); Preeti Rastogi, Bellevue, WA (US); Pieter Retief Kasselman, Dublin (IE); William Louis Thomas, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 275 days.

(21) Appl. No.: 17/523,665

(22) Filed: Nov. 10, 2021

(65) Prior Publication Data
US 2023/0142147 A1    May 11, 2023

(51) Int. Cl.
*G06F 21/30*    (2013.01)
*H04L 9/32*    (2006.01)

(52) U.S. Cl.
CPC ............ *G06F 21/30* (2013.01); *H04L 9/3231* (2013.01); *H04L 9/3247* (2013.01)

(58) Field of Classification Search
CPC ...... G06F 21/30; H04L 9/3231; H04L 9/3247
See application file for complete search history.

(56) References Cited

U.S. PATENT DOCUMENTS

| | | | | |
|---|---|---|---|---|
| 5,776,736 A | * | 7/1998 | Frost | C12N 9/88 536/23.7 |
| 7,234,062 B2 | * | 6/2007 | Daum | H04L 9/32 713/181 |
| 8,316,454 B2 | * | 11/2012 | Valls Fontanals | G06F 21/6254 726/26 |
| 8,718,335 B2 | * | 5/2014 | Mason | G06F 21/32 348/78 |

(Continued)

FOREIGN PATENT DOCUMENTS

WO    WO-9850875 A2 * 11/1998 ............. G06Q 20/04

OTHER PUBLICATIONS

"International Search Report and Written Opinion Issued in PCT Application No. PCT/US22/047949", Mailed Date: Feb. 9, 2023, 15 Pages.

*Primary Examiner* — Venkat Perungavoor
*Assistant Examiner* — Peiliang Pan
(74) *Attorney, Agent, or Firm* — Workman Nydegger

(57) ABSTRACT

Technology that permits two computing systems to communicate with each other with high confidence that a particular entity is present at the other computing system. As an example, when a first computing system communicates with a second computing system, the first computing system may regularly verify that a particular entity is present at the second computing system. The first computing system is actually in control of a proof capture component on the second computing system. The first computing system causes the second computing system to automatically generate proof of presence, the proof evidencing that the par- (Continued)

ticular entity is present at the second computing system. The first computing system also causes the second computing system to include the generated presence proof when communicating from the second computing system to the first computing system.

20 Claims, 5 Drawing Sheets

(56) References Cited

U.S. PATENT DOCUMENTS

| | | | | |
|---|---|---|---|---|
| 9,043,474 B2* | 5/2015 | Schleifer | ............ | H04L 65/4053 |
| | | | | 709/227 |
| 9,582,748 B2* | 2/2017 | Proud | .................... | G16H 50/30 |
| 9,594,669 B2* | 3/2017 | Bates | ................. | G06F 11/3664 |
| 10,270,599 B2* | 4/2019 | Nadeau | ................... | H04L 9/085 |
| 10,452,828 B1* | 10/2019 | Larimer | .................. | G06F 21/45 |
| 10,587,609 B2* | 3/2020 | Ebrahimi | .............. | H04L 9/3247 |
| 10,700,851 B2* | 6/2020 | Lin | ......................... | H04L 9/083 |
| 10,708,060 B2* | 7/2020 | Yang | .................... | H04L 9/3073 |
| 10,728,042 B2* | 7/2020 | Li | ......................... | H04L 9/3247 |
| 10,938,562 B2* | 3/2021 | Liu | ......................... | H04L 63/08 |
| 11,588,657 B2* | 2/2023 | Rolin | .................... | H04L 65/403 |
| 2005/0033702 A1* | 2/2005 | Holdsworth | ........ | G06Q 20/108 |
| | | | | 705/67 |
| 2007/0192601 A1* | 8/2007 | Spain | ...................... | G06F 21/42 |
| | | | | 713/168 |
| 2008/0215887 A1* | 9/2008 | Hart | ........................ | G07F 7/086 |
| | | | | 713/172 |
| 2008/0228653 A1* | 9/2008 | Holdsworth | ............ | G06F 21/34 |
| | | | | 705/67 |
| 2011/0106460 A1* | 5/2011 | Konopacki | ........... | G01M 99/00 |
| | | | | 702/41 |
| 2016/0364729 A1* | 12/2016 | Ruparelia | .......... | G06Q 20/1085 |
| 2020/0143019 A1* | 5/2020 | Chen | .................... | H04L 9/0894 |
| 2020/0403795 A1 | 12/2020 | Murdoch et al. | | |
| 2021/0218574 A1* | 7/2021 | Mao | ....................... | H04L 63/04 |
| 2021/0248514 A1* | 8/2021 | Cella | ...................... | G06V 20/20 |
| 2021/0273931 A1 | 9/2021 | Murdoch et al. | | |
| 2021/0327547 A1* | 10/2021 | Praszczalek | ........... | G16H 10/60 |
| 2021/0328804 A1* | 10/2021 | Snow | .................... | H04L 9/0643 |
| 2022/0067681 A1* | 3/2022 | Choi | ................... | G06Q 20/3821 |
| 2022/0210150 A1* | 6/2022 | Neubauer | ............. | H04W 4/022 |
| 2023/0142147 A1* | 5/2023 | Patel | ...................... | G06F 21/30 |
| | | | | 726/26 |
| 2023/0232222 A1* | 7/2023 | Ohashi | .................. | H04W 12/06 |
| | | | | 455/411 |

* cited by examiner

NETWORK COMMUNICATION USING
PROOF OF PRESENCE

BACKGROUND

The information age is largely enabled by computing systems communicating with each other over networks. Secure communication is critical since the information exchanged can often be quite sensitive. If that information is acquired by an improper party, privacy is often breached and the information can be used for improper purposes. One way to improperly obtain information is for one party to attempt to appear as though they are a trusted party with the aim to elicit the other party enter sensitive information (such as name, address, government identity numbers, credit card numbers, bank account information, passwords, security credentials, and the like). This is often called phishing. Even sophisticated users can be victims of phishing attacks as phishing attacks are becoming more and more convincing.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The principles described herein relate to technology that permits two computing systems to communicate with each other with high confidence that a particular entity is present at the other computing system. As an example, when a first computing system communicates with a second computing system, the first computing system may regularly verify that a particular entity is present at the second computing system.

For instance, if that particular entity was a human user of the second computing system, the first computing system can regularly verify that it is communicating via the second computing system with the actual trusted particular user. That makes it far more difficult for another user to step in and pretend to be the particular trusted entity (and thereby fraudulently elicit sensitive information). On the other hand, if the particular entity is an executable component, the first computing system can regularly verify that it is communicating with an executable component that is actually running on the second computing system. This makes it far more difficult for another executable component to pretend to be that trusted executable component since physical presence on the second computing system is regularly verified.

In accordance with the communication technique, the first computing system is actually in control of a proof capture component on the second computing system. The first computing system causes the second computing system to automatically generate proof of presence, the proof evidencing that the particular entity is present at the second computing system. The first computing system also causes the second computing system to include the generated presence proof when communicating from the second computing system to the first computing system.

For each of one or more communications received from the second computing system, the first computing system reads the presence proof from the communication, and estimates from that presence proof whether the particular entity is present at the second computing system. If the estimation is that the particular entity is present at the second computing system, the first computing system passes the communication thereby treating the particular entity as present at the second computing system. On the other hand, if the estimation is not that the particular entity is present at the second computing system, the first computing system fails the communication thereby treating the communication as not being from the particular entity.

The second computing system may likewise regularly verify that another particular entity is present at the first computing system. Thus, both computing systems can have high confidence that they are communicating with the intended opposite entity, rather than with an imposter involved in a phishing attack. The particular entity's presence at the second computing system may also be verified when the user is physically present at a mobile device that is capable of verifying physical presence at a network node that is in actual communication with the first computing system.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

Figure 1:
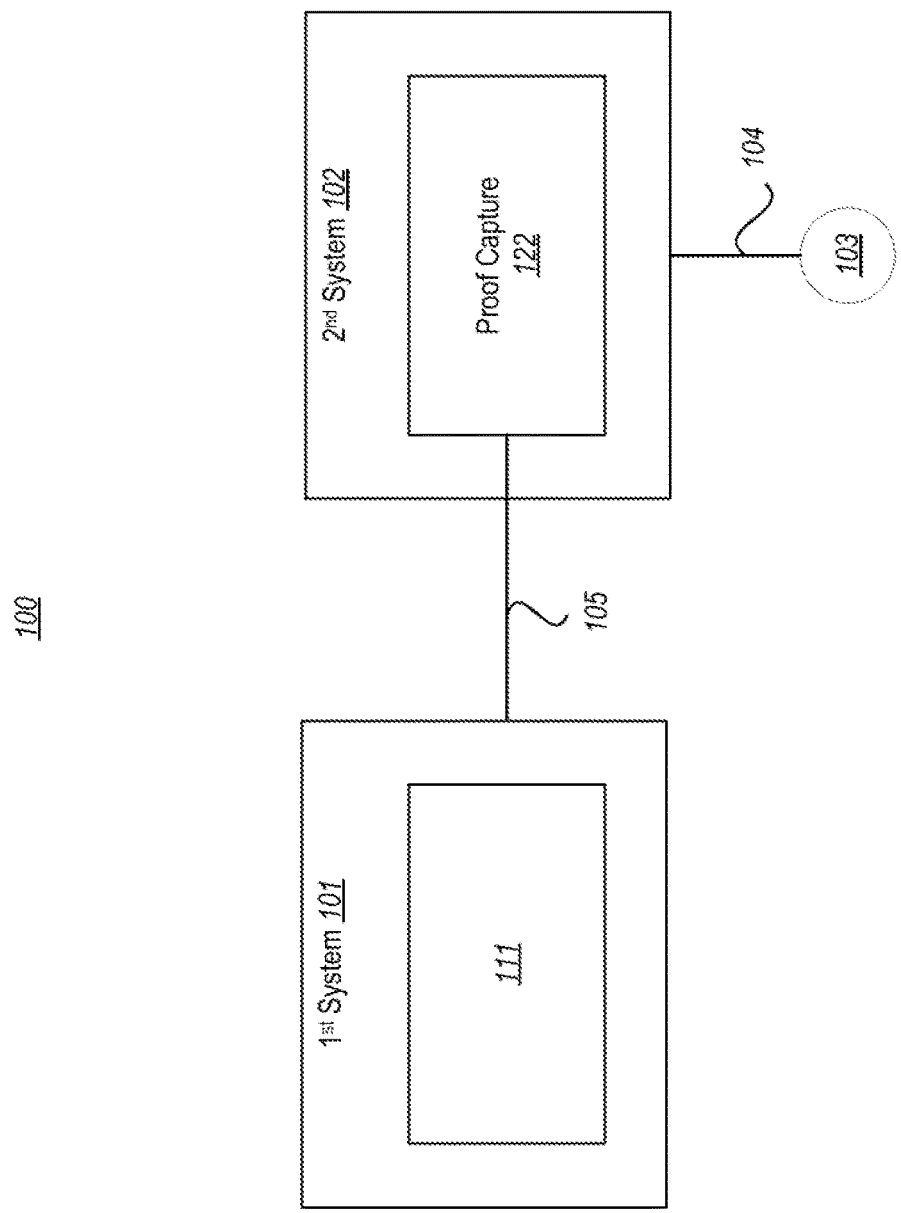
FIG. 1 illustrates an environment in which a first computing system uses a proof capture component on a second computing system in order to prove that a particular entity is present at a second computing system, in accordance with the principles described herein.

The principles described herein relate to technology that permits two computing systems to communicate with each other with high confidence that a particular entity is present at the other computing system. As an example, when a first computing system communicates with a second computing system, the first computing system may regularly verify that a particular entity is present at the second computing system.

For instance, if that particular entity was a human user of the second computing system, the first computing system can regularly verify that it is communicating via the second computing system with the actual trusted particular user. That makes it far more difficult for another user to step in and pretend to be the particular trusted entity (and thereby fraudulently elicit sensitive information). On the other hand, if the particular entity is an executable component, the first computing system can regularly verify that it is communicating with an executable component that is actually running on the second computing system. This makes it far more difficult for another executable component to pretend to be that trusted executable component since physical presence on the second computing system is regularly verified.

In accordance with the communication technique, the first computing system is actually in control of a proof capture component on the second computing system. The first computing system causes the second computing system to automatically generate proof of presence, the proof evidencing that the particular entity is present at the second computing system. The first computing system also causes the second computing system to include the generated presence proof when communicating from the second computing system to the first computing system.

For each of one or more communications received from the second computing system, the first computing system reads the presence proof from the communication, and estimates from that presence proof whether the particular entity is present at the second computing system. If the estimation is that the particular entity is present at the second computing system, the first computing system passes the communication thereby treating the particular entity as present at the second computing system. On the other hand, if the estimation is not that the particular entity is present at the second computing system, the first computing system fails the communication thereby treating the communication as not being from the particular entity.

The second computing system may likewise regularly verify that another particular entity is present at the first computing system. Thus, both computing systems can have high confidence that they are communicating with the intended opposite entity, rather than with an imposter involved in a phishing attack. The particular entity's presence at the second computing system may also be verified when the user is physically present at a mobile device that is capable of verifying physical presence at a network node that is in actual communication with the first computing system.

First, communication in one direction between computing systems will be described with respect to FIG. 1. FIG. 1 illustrates an environment 100 in which a computing system 102 is to communicate to another computing system 101. The computing system 101 will be referred to herein as the "first computing system", and computing system 102 will be referred to herein as the "second computing system." Unless otherwise indicated, the use of the modifiers "first", "second" and so forth, are merely to distinguish one item or action from another, and should not be read as implying any other relationship between the modified items or terms. In the case of FIG. 1, the second computing system 102 is communicating to the first computing system 101. As an example, each of the first computing system 101 and the second computing system 102 may be structured as described below for the computing system 500 of FIG. 5.

The first computing system 101 controls part of the second computing system 102 in order to confirm that a particular entity 103 is present at the second computing system. Physical presence of the particular entity 103 at the second computing system is represented by the line 104. The particular entity 103 could be a human user of the second computing system 102. Alternatively, the particular entity 103 could be an executable component running on the second computing system 102. As an example, if the second computing system 102 is structured as described below for the computing system 500, the executable component 103 may be structured as described below for the executable computing 506 of FIG. 5. In an example referred to herein as a "hotel check-in kiosk example", the second computing system 102 is a kiosk at a hotel, the particular entity 103 is a hotel customer about to check-in, and the first computing system 101 is a hotel computer.

The second computing system 102 includes a proof capture component 122 that is configured to automatically generate proof (called hereinafter "presence proof") that the particular entity 103 is physically present (as represented by line 104) at the second computing system 102. As an example only, if the particular entity 103 was a human user, the proof capture component 103 may be configured to capture a biometric of the human user. As an example, the proof capture component may be a camera driver configured to take a picture of the human user. Such a picture taken by the camera would indeed prove that the human user was physically present at the second computing system 103. Of course, such a picture would taken be with appropriate information and prompts to the human user insuring appropriate consent, or under circumstances suggesting implicit consent.

The first computing system 101 is in control (as represented by line 105) of the proof capture component 122 on the second computing system 101. As an example, this control is possible where the owner of the first computing system 101 and the second computing system 102 are one in the same. For instance, in the hotel check-in kiosk example, the kiosk and the hotel computer both belong to the hotel. Accordingly, the hotel computer (which is an example of the first computing system 101) is in control of the camera (which is an example of the proof capture component 122) on the check-in kiosk (which is an example of the second computing system 102).

In another example, the control 105 is enabled even with the first computing system 101 and the second computing system 102 being remote and/or owned by different entities. The particular entity 103 may (for example) give control of the proof capture component 122 to the first computing system 101 at the beginning of a communication session. As an example, this could occur using verifiable credentials. The first computing system 101 could, for example, cause an authentication request to be visualized to the second computing system 102 (e.g., in the form of a QR code), which includes a request for permission to use the camera on a user's mobile phone. The user could then provide the authentication and the permission at the time the session begins or during registration. Thereafter, the first computing system 101 could cause the camera on the second computing system 102 to activate by presenting a verifiable credential indicating the first computing system 101 indeed has that permission.

Figure 2:
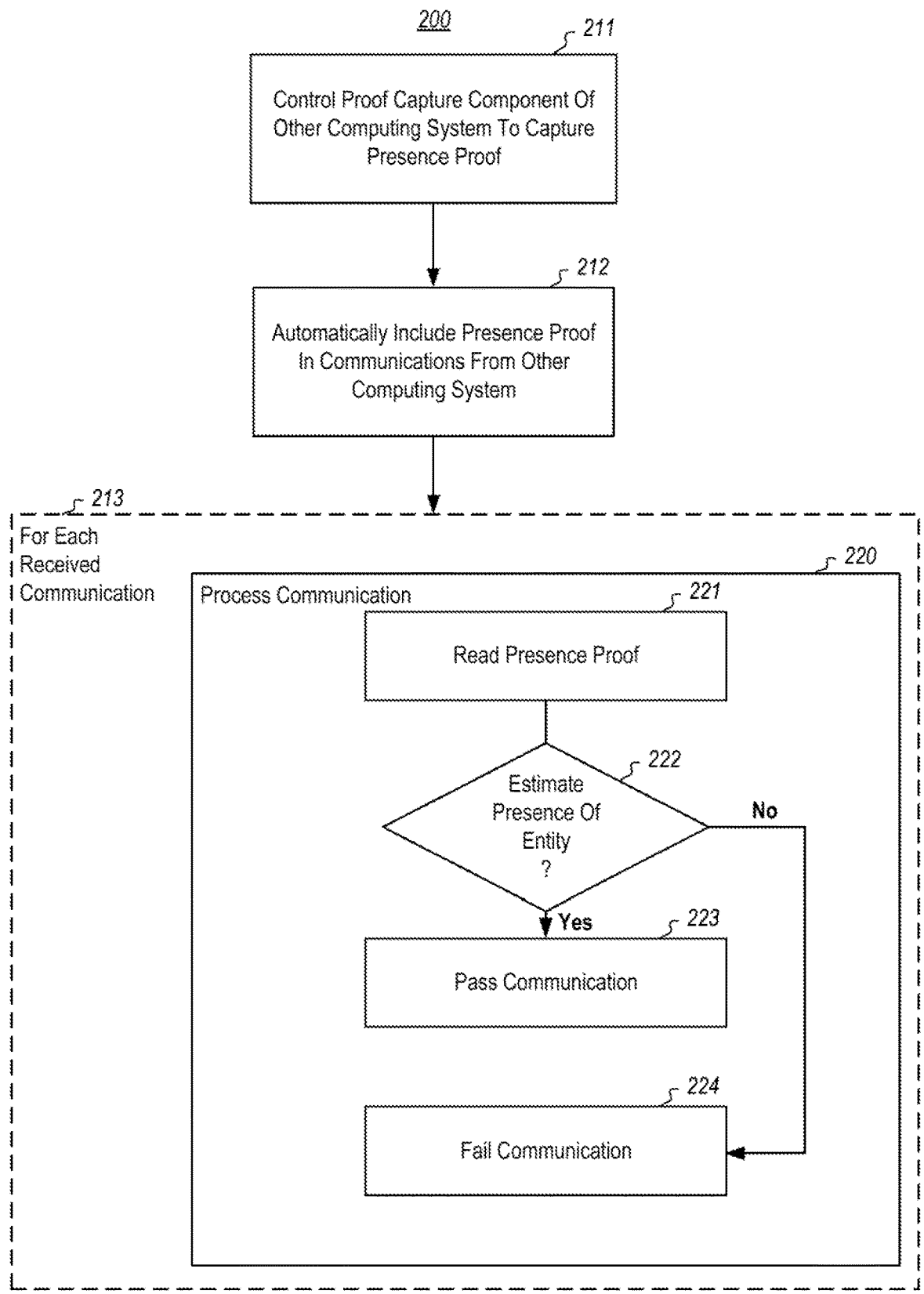
FIG. 2 illustrates a flowchart of a method 200 for a first computing system to receive a communication from a second computing system in accordance with the principles described herein.

FIG. 2 illustrates a flowchart of a method 200 for a first computing system to receive a communication from a second computing system in accordance with the principles described herein. The method 200 of FIG. 2 may be performed within the environment 100 of FIG. 1, in which case the method 200 is for the first computing system 101 to receive a communication from the second computing system 102. Accordingly, the method 200 of FIG. 2 will now be described with frequent reference to the environment 100 of FIG. 1.

In the context of FIG. 1, the method 200 may be performed by the executable component 111 of the first computing system. The executable component 111 may be structured as described below for the executable component 506 of FIG. 5. Specifically, the executable component 111 may be instantiated and/or operate in response to one of more processors of the first computing system 101 executing computer-executable instructions that are structured in order to instantiate and/or operate the executable component. If the method 200 is performed by the first computing system 101, the first computing system 101 may be structured to perform the method 200 in response to accessing a computer program product having thereon computer-executable instructions that are structured such that, when executed by one or more processors of the first computing system 101, the first computing system 101 is caused to perform the method 200.

The method 200 includes an act of controlling a proof capture component of the second computing system to automatically generate presence proof that a particular entity is present at the second computing system (act 211). For instance, in FIG. 1, the first computing system 101 (or specifically the executable component 111) causes the proof capture component 122 to capture proof that the particular entity 103 is present at the second computing system 102.

Figure 3:
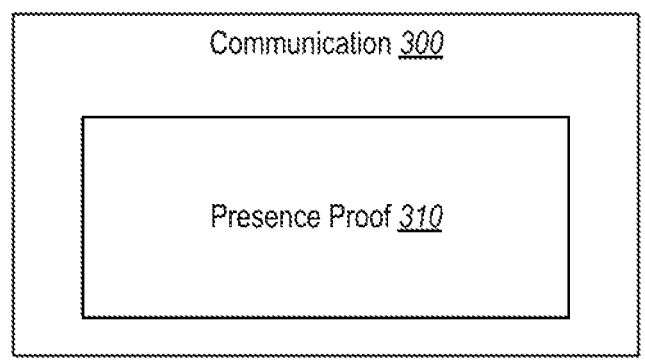
FIG. 3 illustrates an example communication that includes presence proof, in accordance with the principles described herein.

The method 200 then includes an act of automatically causing the second computing system to include the generated presence proof when communicating from the second computing system to the first computing system (act 212). Referring to FIG. 1, the first computing system 101 (e.g., using the executable component 111) automatically causes the second computing system 102 to include the presence proof when the second computing system 102 sends a communication to the first computing system 101. FIG. 3 illustrates an example communication 300 that includes presence proof 310.

Thereafter, the method 200 includes performing certain acts for each of at least one or more (and perhaps multiple) communications received from the second computing system. These certain acts are illustrated as being encompassed by the dashed-lined box 213. While the certain acts within the box 213 may be performed for all communications received from the second computing system, they may be performed for a single one received communication, or just some of the received communications received from the second computing system. Furthermore, the certain acts may be performed for one, some, or all of the communications received from the second computing system as part of a session between the first and second computing systems.

Referring to FIG. 2, for each received communication, the first computing system (e.g., using the executable component 111) processes the communication (act 220). This is performed by reading the presence proof from the communication (act 221), and then estimating from that presence proof whether the particular entity is present at the second computing system (decision block 222).

If the estimation is that the particular entity is present at the second computing system ("Yes" in decision block 222), the communication is passed (act 223). Passing the communication means that the processing assumes as true that the particular entity as present at the second computing system. Referring to the example of FIG. 1, the first computing system 101 would process the communication from the second computing system 102 treating as true the fact that the particular entity 103 is present at the second computing system 102. In other words, given that the particular entity 103 is trusted to the first computing system 101, the first computing system 101 can conclude that the received communication is not a phishing attack.

On the other hand, if the estimation is not that the particular entity is present at the second computing system ("No" in decision block 222), the communication is failed (act 224). Failing the communication means that the processing does not treat as true that the particular entity is present at the second computing system. Referring to the example of FIG. 1, the first computing system 111 would process the communication from the second computing system 102 without treating as true the fact that the particular entity 103 is present at the second computing system 102. This failure could simply involve ignoring the communication. After all, the first computing system 101 has not been able to confirm that the received communication is not a phishing attack.

Accordingly, when the first computing system 101 establishes a session or other relationship with a second computing system 102, and more particularly with a particular entity present at the second computing system 102, the first computing system 101 can establish what constitutes sufficient proof that the particular entity is at the computing system that the first computing system 101 is communicating with. The first computing system 101 can then check that when future communications are received from a computing system purporting to be the second computing system 102, that the second computing system 102 is able to provide proof that the particular entity 103 is present at the second computing system. This provides greater assurance that the first computing system 101 is communicating with the particular entity 103, and not with another entity pretending to be that particular entity 103.

Figure 4:
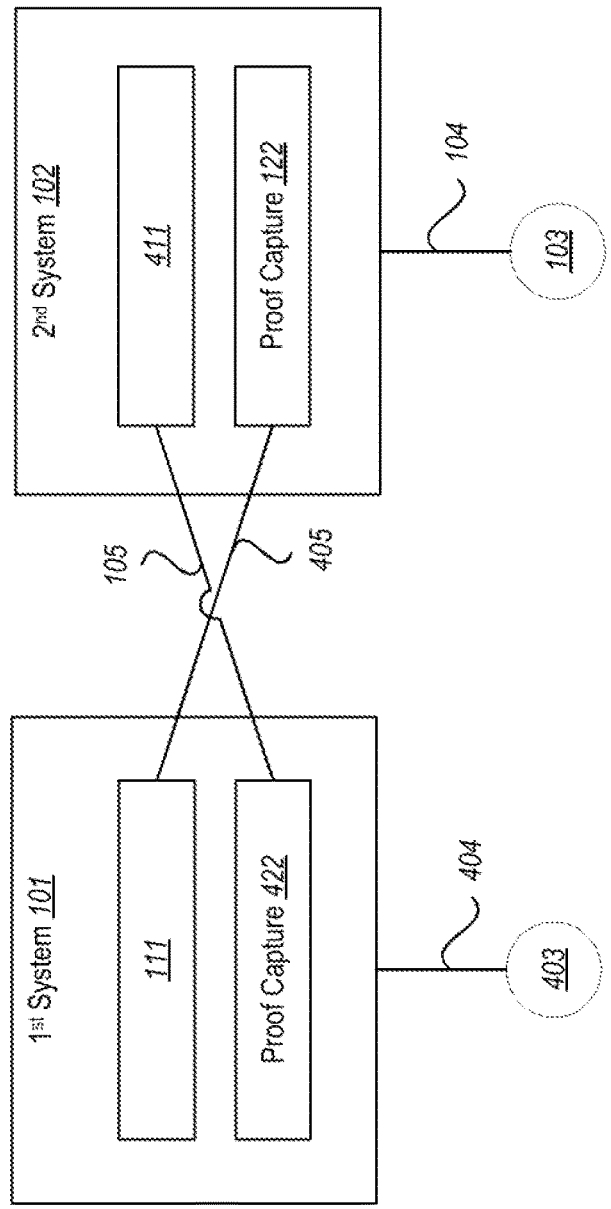
FIG. 4 illustrates an example environment that is similar to FIG. 1, except that both computing systems have proof capture components, and thus the method of FIG. 2 may be accomplished bi-directionally.

The second computing system 102 may likewise perform the same method when receiving communication from the first computing system 101. In that case, the second computing system 102 would be in control of a proof capture component at the first computing system, and be able to confirm that a particular entity is present at the first computing system. FIG. 4 illustrates an example environment in which the process described above may be accomplished bi-directionally.

Here, the first system 101 additionally includes a proof capture component 422 that is in the control (as represented by the line 405) of an executable component 411 running on the second computing system 102. The executable component 411 may be structured as described below for the executable component 506 of FIG. 5. Specifically, the executable component 411 may be instantiated and/or operate in response to one of more processors of the second computing system 201 executing computer-executable instructions that are structured in order to instantiate and/or operate the executable component. If the method 200 is performed by the second computing system 102, the second computing system 102 may be structured to perform the method 200 in response to accessing a computer program product having thereon computer-executable instructions that are structured such that, when executed by one or more processors of the second computing system 102, the second computing system 102 is caused to perform the method 200.

Thus, whenever the particular entities 403 and 103 communicate with each other through their respective computing systems 101 and 102, the computing systems may regularly verify that the communications they receive from the other party truly are from the other party, and not from some other unexpected or deceptive party. Thus, the principles described herein prevent phishing attacks by entities persuasively pretending to be an entity that they are not.

The particular entity 403 could be a human user of the first computing system 101, or perhaps an executable component running on the first computing system 101. Likewise, the particular entity 103 could be a human user of the second computing system 102, or perhaps an executable component running on the second computing system 102.

In the case of the other entity being a human user, the presence proof could be a biometric of the human user. In that case, estimating whether the presence proof indicates that the human user is still present at the other computing system (decision block 222) may involve comparing the biometric included with the recent communication with a previously captured biometric of the user.

There may be cases where an exact match of the biometric should be indicative that the previously capture biometric has been stolen and replayed. This would indicate that somehow the computing system has lost control of the proof capture component of the other computing system. Accordingly, there may be a certain level of difference expected between the previously captured biometric and the current biometric, sufficient to enable a conclusion that the biometric is of the same human user, but is sufficiently different so as to reflect a different instance of measurement of the biometric of the human user. As an example, a photograph taken at the beginning of communications may not be exactly the same as a photograph recently taken when comparing pixel by pixel. Nevertheless, recognition would still recognize the human user as being the same human being.

In the case of the other entity being an executable component, the presence proof may be a signal signed at least in part by information provided by the other party. As an example, suppose that entity 103 is an executable component. The first computing system 101 may provide a key, such as a Decentralized Identifier (e.g., DID) key to the executable component of the second computing system 102. The second computing system 102 would then capture proof of presence of the executable component 103 by signing the communication using that information as provided by the executable component 103. Such a signature represents proof that the executable component 103 is present at the second computing system 102. This executable component could be, for instance, a session component that exists during a session between the two computing systems.

As an example, suppose that the first computing system is a hotel computer, and the second computing system is a kiosk owned by the hotel. The particular entity in the presence of the hotel computer may be an automatic check-in component running on the hotel computer. The particular entity in the presence of the kiosk may be a hotel customer that just approached the kiosk and indicated to the kiosk an intent to check in. The particular user at the kiosk may provide a DID key into the kiosk which is provided to the hotel computer. The hotel computer takes a picture of the hotel customer and provides the picture also to the hotel computer. For privacy preserving purposes, the user may also present an ephemeral key that cannot be correlated across applications instead of using a user bound DID or a biometric.

Now suppose the hotel computer sends an authentication request to the kiosk asking the user to authenticate themselves. This authentication request is signed using the DID key provided by the particular user, thereby allowing the kiosk to confirm that the authentication request truly comes from an entity on the hotel computer. Thus, the authentication request is manifested to the hotel customer. The hotel computer prompts the user for the authentication information, and takes a picture of the hotel customer. The information along with the picture of the hotel customer is then sent to the hotel computer. The hotel computer compares the two pictures of the customer (one taken when the session began, and the other taken when the customer's information was submitted) to determine the information comes from the customer. This makes it far more difficult for something to eavesdrop on that conversation after the session has begun, and thereby conduct a phishing attack.

Because the principles described herein are performed in the context of a computing system, some introductory discussion of a computing system will be described with respect to FIG. 5. Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 5:
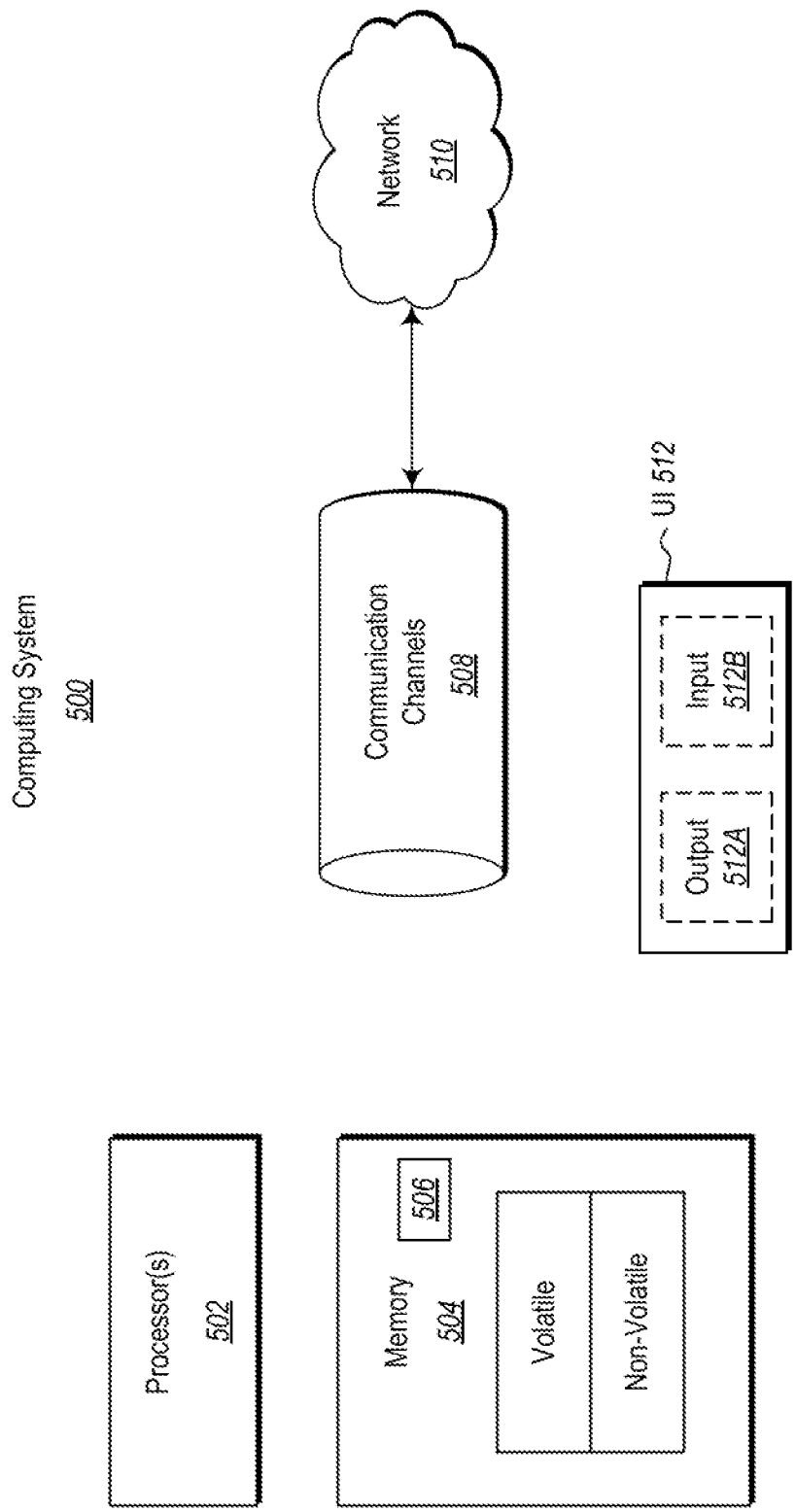
FIG. 5 illustrates an example computing system in which the principles described herein may be employed.

As illustrated in FIG. 5, in its most basic configuration, a computing system 500 includes at least one hardware processing unit 502 and memory 504. The processing unit 502 includes a general-purpose processor. Although not required, the processing unit 502 may also include a field programmable gate array (FPGA), an application specific integrated circuit (ASIC), or any other specialized circuit. In one embodiment, the memory 504 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 500 also has thereon multiple structures often referred to as an "executable component". For instance, the memory 504 of the computing system 500 is illustrated as including executable component 506. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 504 of the computing system 500. Computing system 500 may also contain communication channels 508 that allow the computing system 500 to communicate with other computing systems over, for example, network 510.

While not all computing systems require a user interface, in some embodiments, the computing system 500 includes a user interface system 512 for use in interfacing with a user. The user interface system 512 may include output mechanisms 512A as well as input mechanisms 512B. The principles described herein are not limited to the precise output mechanisms 512A or input mechanisms 512B as such will depend on the nature of the device. However, output mechanisms 512A might include, for instance, speakers, displays, tactile output, virtual or augmented reality, holograms and so forth. Examples of input mechanisms 512B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RANI and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A first computing system comprising:
   one or more processors; and
   one or more computer-readable media having thereon computer-executable instructions that are executable by the one or more processors to cause the first computing system to:
   cause a second proof capture component of a second computing system to obtain a presence proof that a particular entity is present at the second computing system, wherein the presence proof is of a first type;
   read the presence proof from a communication received from the second computing system, wherein the presence proof includes a first proof and a second proof, the first proof comprising a decentralized identifier (DID) key of the particular entity;
   estimate, from the presence proof, whether the particular entity is present at the second computing system;
   if the estimation is that the particular entity is present at the second computing system, accept the communication, thereby treating the particular entity as present at the second computing system;
   if the estimation is not that the particular entity is present at the second computing system, reject the communication, thereby not treating the communication as though the particular entity is present at the second computing system, wherein, when the estimation is that the particular entity is not present at the second computing system, the communication is rejected as a result of the estimation indicating that the second proof exactly matches previously obtained proof data of the particular entity;
   facilitate a bi-directional proof process between the first computing system and the second computing system by providing control of a first proof capture component of the first computing system to the second computing system; and
   in response to an instruction received from the second computing system, use the first proof capture component to obtain a second presence proof and transmit the second presence proof to the second computing system, wherein the second presence proof is of a second type that is different than the first type.

2. The first computing system in accordance with claim 1, wherein the presence proof further includes a picture.

3. The first computing system in accordance with claim 1, wherein the proof of capture includes biometric data.

4. The first computing system in accordance with claim 1, the presence proof being second presence proof, the particular entity being a second particular entity.

5. The first computing system in accordance with claim 1, the particular entity being a human user of the second computing system, the presence proof including a biometric of the human user.

6. The first computing system in accordance with claim 5, the biometric of the human user being a picture of the human user, the proof capture component being a camera of the second computing system.

7. The first computing system in accordance with claim 1, the particular entity being an executable component running on the second computing system.

8. A method for a first computing system to communicate with a second computing system, the method comprising:
   causing a second proof capture component of the second computing system to obtain a presence proof that a particular entity is present at the second computing system, wherein the presence proof is of a first type;
   reading the presence proof from a communication received from the second computing system, wherein the presence proof includes a first proof and a second proof, the first proof comprising a decentralized identifier (DID) key of the particular entity;
   estimating, from the presence proof, whether the particular entity is present at the second computing system;
   if the estimation is that the particular entity is present at the second computing system, accepting the communication thereby treating the particular entity as present at the second computing system;
   if the estimation is not that the particular entity is present at the second computing system, rejecting the communication thereby treating the communication as not being from the particular entity, wherein, when the estimation is that the particular entity is not present at the second computing system, the communication is rejected as a result of the estimation indicating that the second proof exactly matches previously obtained proof data of the particular entity;

facilitate a bi-directional proof process between the first computing system and the second computing system by providing control of a first proof capture component of the first computing system to the second computing system; and in response to an instruction received from the second computing system, use the first proof capture component to obtain a second presence proof and transmit the second presence proof to the second computing system, wherein the second presence proof is of a second type that is different than the first type.

9. The method in accordance with claim 8, the particular entity being a human user of the second computing system.

10. The method in accordance with claim 9, the presence proof including a biometric of the human user.

11. The method in accordance with claim 10, the biometric of the human user being a picture of the human user, the proof capture component being a camera of the second computing system.

12. The method in accordance with claim 10, the estimation from the presence proof whether the particular entity is present at the second computing system comprising comparing the biometric of the human user with a previously captured biometric of the human user.

13. The method in accordance with claim 8, the particular entity being an executable component running on the second computing system.

14. The method in accordance with claim 13, the presence proof being a verifiable credential of the executable component.

15. The method in accordance with claim 13, the presence proof being a signature signed by at least in part information provided by the first computing system.

16. The method in accordance with claim 13, the executable component being a session component such that the first computing system communicates with a second computing system in a session associated with the session component.

17. A computer program product comprising one or more computer-readable storage media having thereon computer-executable instructions that are executable by one or more processors of a first computing system to cause the first computing system to:

cause a second proof capture component of the second computing system to obtain a presence proof that a particular entity is present at the second computing system, wherein the presence proof is of a first type;

read the presence proof from a communication received from the second computing system, wherein the presence proof includes a first proof and a second proof, the first proof comprising a decentralized identifier (DID) key of the particular entity;

estimate, from the presence proof, whether the particular entity is present at the second computing system;

if the estimation is that the particular entity is present at the second computing system, accept the communication, thereby treating the particular entity as present at the second computing system;

if the estimation is not that the particular entity is present at the second computing system, reject the communication, thereby not treating the communication as though the particular entity is present at the second computing system, wherein, when the estimation is that the particular entity is not present at the second computing system, the communication is rejected as a result of the estimation indicating that the second proof exactly matches previously obtained proof data of the particular entity;

facilitate a bi-directional proof process between the first computing system and the second computing system by providing control of a first proof capture component of the first computing system to the second computing system; and in response to an instruction received from the second computing system, use the first proof capture component to obtain a second presence proof and transmit the second presence proof to the second computing system, wherein the second presence proof is of a second type that is different than the first type.

18. The computer program product in accordance with claim 17, the particular entity being a human user of the second computing system, the presence proof including a biometric of the human user.

19. The computer program product in accordance with claim 18, the biometric of the human user being a picture of the human user, the proof capture component being a camera of the second computing system.

20. The computer program product in accordance with claim 17, the particular entity being an executable component running on the second computing system.

* * * * *